Patented Mar. 29, 1932

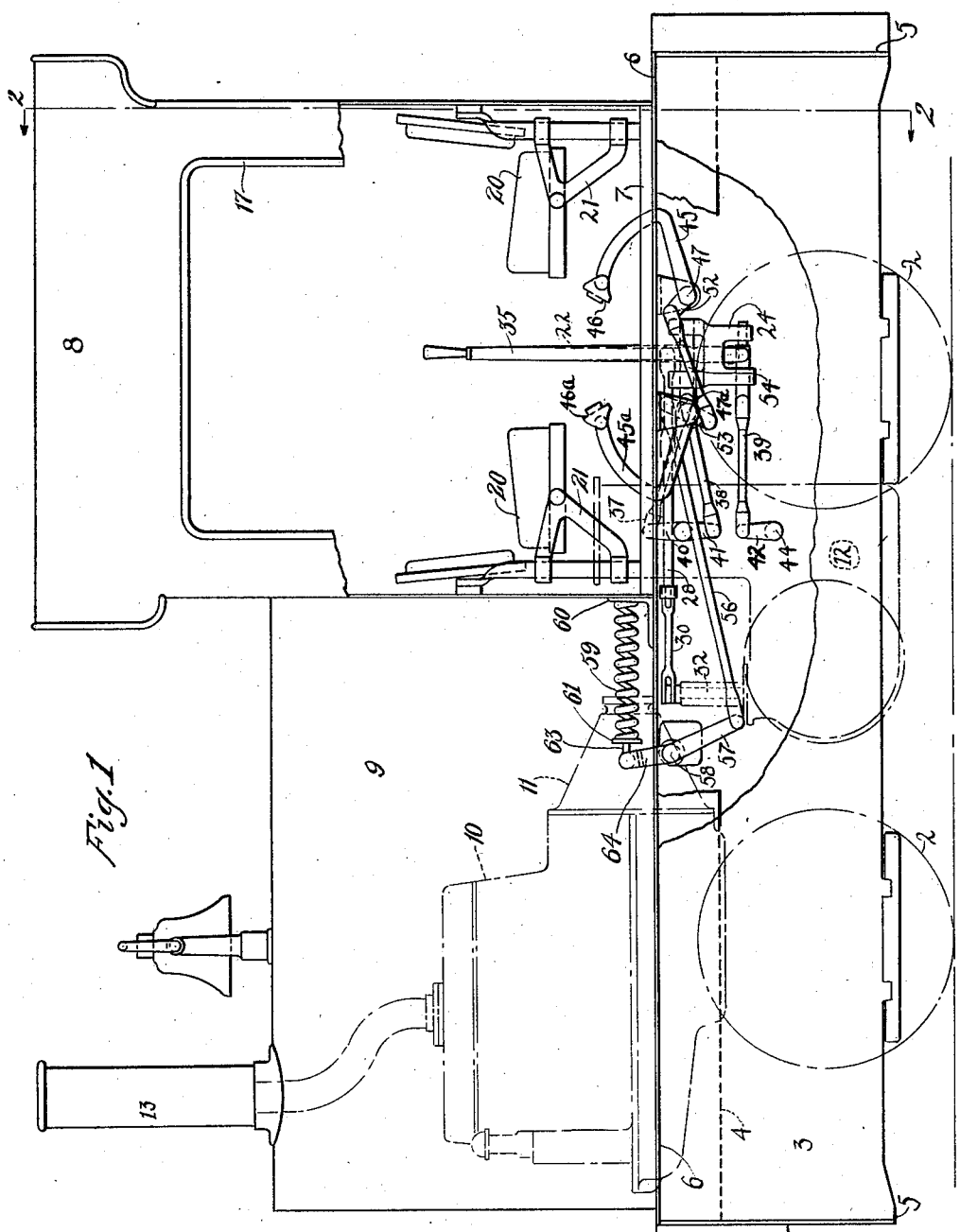

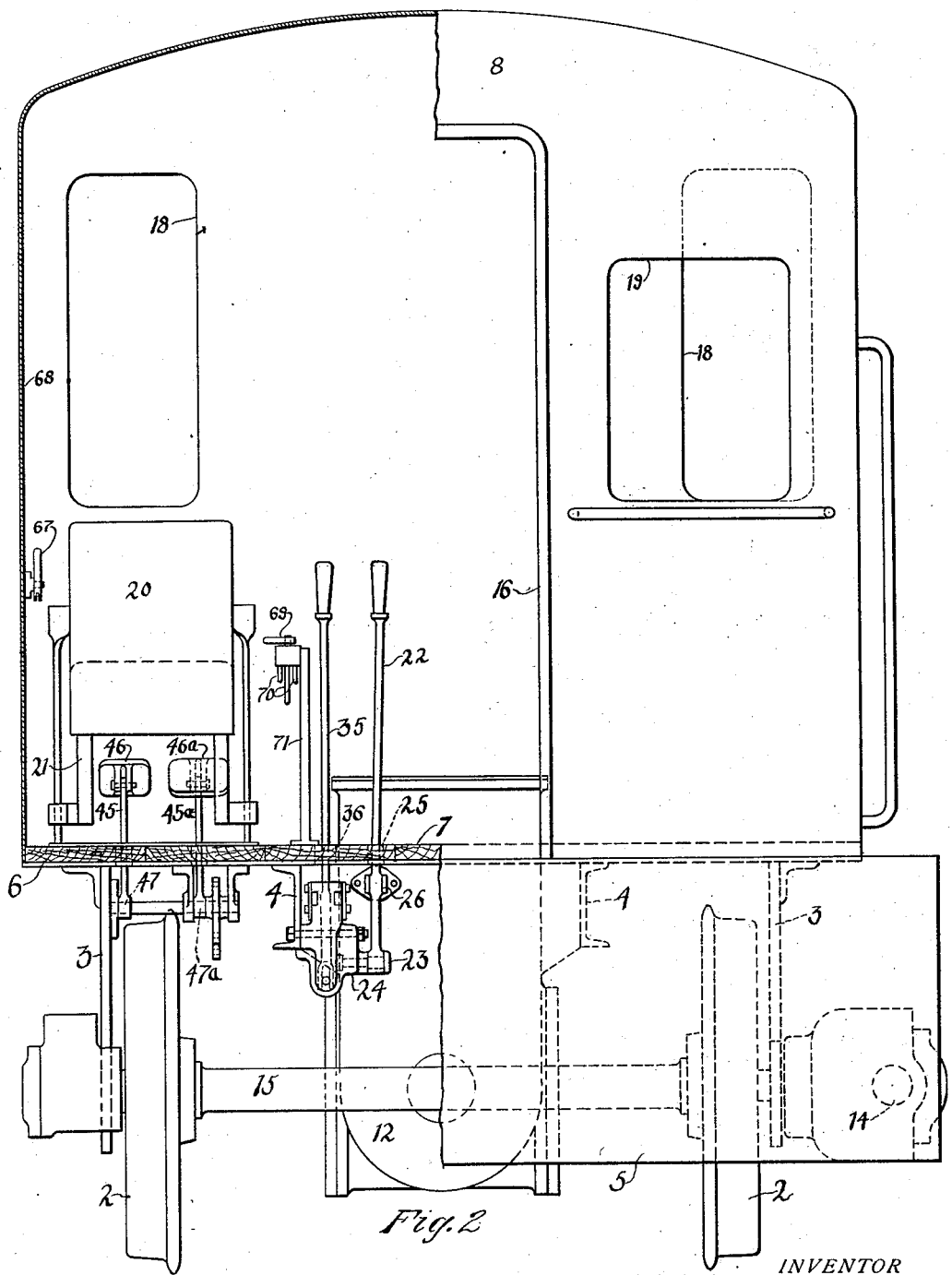

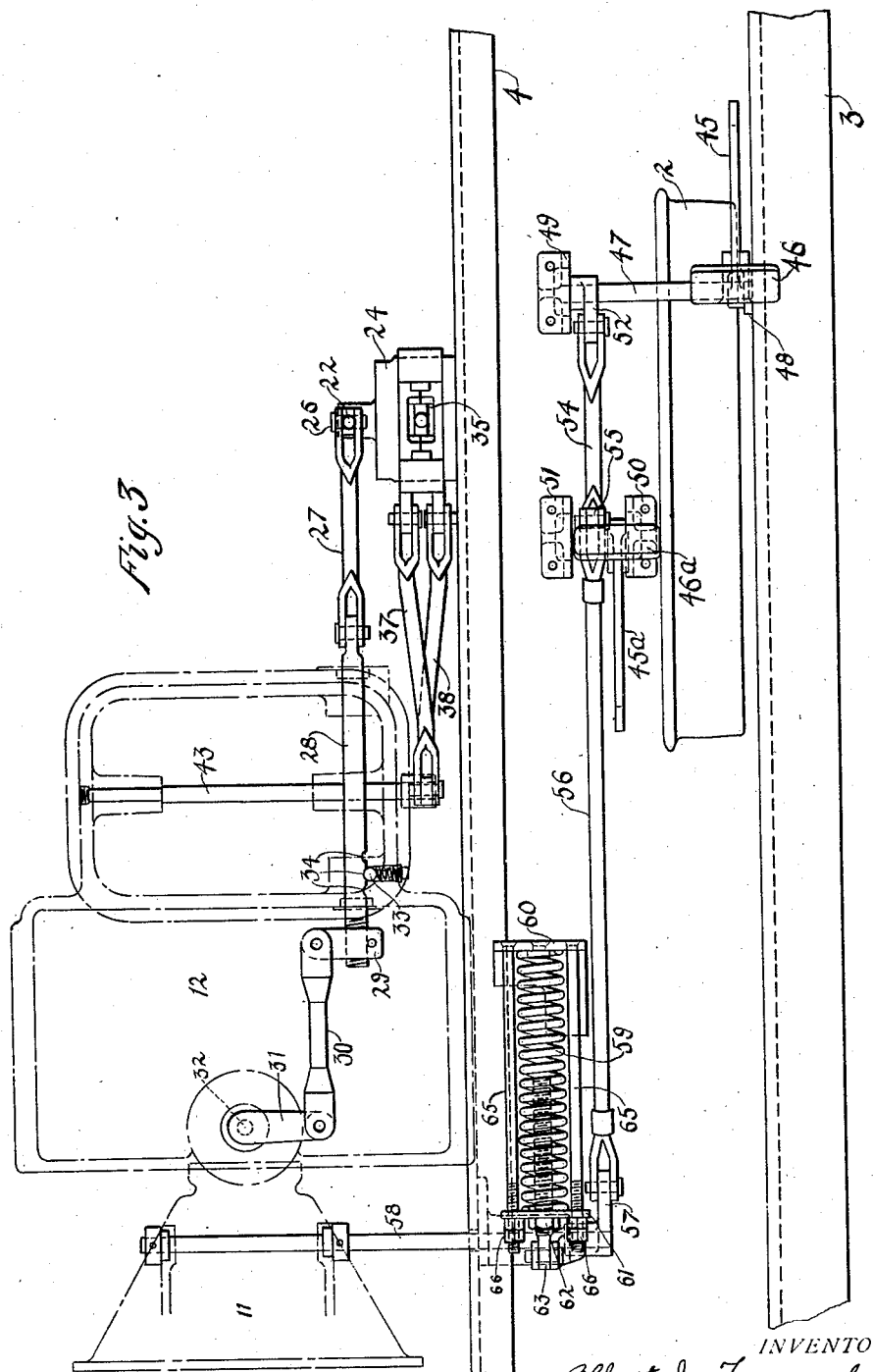

1,851,468

UNITED STATES PATENT OFFICE

ALBERT J. TOWNSEND, OF LIMA, OHIO

LOCOMOTIVE

Application filed March 20, 1930. Serial No. 437,334.

This invention relates to locomotives and particularly to locomotive control mechanism and the disposition thereof with relation to the framing, seats, cab and running gear of the locomotive. While the invention may be employed to advantage in locomotives generally, it is of especial use in connection with industrial, switching or yard engines, the operation of which involves considerable shunting and substantially as much reverse running as forward running, and the invention is therefore herein illustrated as applied to an industrial locomotive, the particular locomotive shown being of the internal-combustion-powered type.

One of the primary objects of the invention is to provide full and flexible control of the locomotive whether operating forwardly or in reverse; and, coupled with this: to simplify and make safer the operation of the locomotive and the shunting of cars, to provide a more convenient and comfortable cab arrangement, to insure proper vision ahead when operating in either direction, and to accomplish the foregoing without waste of cab space.

More specifically, the invention contemplates a unified control arrangement convenient for forward and reverse operation; novel and improved means of connecting the control members with the operating mechanism of the locomotive; a dual control arrangement with little or no increase in the number of parts required; a double seating arrangement in the cab with controls operated readily from either seat; and other features of construction and resultant operating and maintenance advantages as will more fully hereinafter appear.

How the foregoing objects and advantages, together with others which are incident to the invention or which may occur to those familiar with this art, are obtained, will be clear from the following description taken together with the accompanying drawings, in which drawings:

Figure 1 is a side elevational view of a locomotive embodying the invention, with certain parts of the cab and frame broken away to show numerous details of the construction;

Figure 2 is in part a rear elevation, and in part a transverse section on line 2—2 of Fig. 1; of the locomotive there illustrated, but on an enlarged scale; and Figure 3 is a fragmentary plan view of the control mechanism and associated parts of the locomotive of Figs. 1 and 2, but on a still larger scale.

Referring first to Figs. 1 and 2, it will be seen that the locomotive in general is of the four-wheel gasoline-engined type, having wheels 2, outer and inner longitudinal frame members, 3, 4, end frame members 5, deck or floor 6 which may be covered in the cab by boarding 7, cab 8, engine hood 9, gasoline motor 10, clutch and gear cases or housings 11, 12, and engine exhaust outlet or stack 13, the engine, clutch-case and gear-box being conveniently mounted, in part forwardly of the cab and in part therebeneath, between the inner longitudinal frame members or braces 4, 4. The locomotive framing, the particular mounting therein of the aforementioned parts, and the drive connections from the transmission case to the longitudinal drive-shaft 14 which is geared to axles 15, need not be here illustrated or described in detail, as they form per se no part of the present invention, but the same are fully disclosed and claimed in my co-pending applications: No. 441,208, filed April 3, 1930; and No. 472,-644, filed August 2, 1930.

From the drawings in general, it will be seen that the cab, in addition to rear door 16 and side windows 17, is provided, preferably at each side, with a front window 18 and a rear window 19, and at one side of the cab (here shown as the left side) is a pair of seats 20, facing toward each other, and each supported beneath a window (18 or 19 as the case may be) on a suitable frame 21, so that, in forward operation the engineer sits on the rear seat 20 and has a view through window 18, while in reverse operation the engineer may sit on the front seat 20 with vision through window 19.

Between the seats, and within ready reach from either, various controls are placed, as follows, (the positions described being with relation to the rear seat, as in Fig. 2):

A vertically-extending reversing lever 22, at the right of the seat, extends upwardly from its fulcrum 23 which is secured by the bracket 24 to the inner side of the left inner frame member 4, and said lever by forward and backward movement (in slot 25 through the cab deck) actuates, through connection 26, the forwardly extending rod sections 27, 28, which in turn are linked by an adjustable connection 29 to rod 30 and lever 31, the latter acting as a crank to turn shaft 32 which extends into transmission case 12 and actuates a reversing gear (not shown). A spring-pressed ball or plunger 33 (see Fig. 3) is fixedly mounted, for engagement with forward, neutral, and reverse notches 34 on rod member 28, said member being preferably mounted for fore and aft sliding movement in fixed guides.

A gear lever 35, provided adjacent the reverse lever 22, (movable in the floor slot 36) is mounted in the bracket 24, which serves also as a housing for any suitable selector means, with which the lever may be engaged by movement forwardly and rearwardly, toward the right and toward the left, the selectors (not shown) actuating rods 37, 38 and 39, cranks 40, 41 and 42, and cross shafts 43, 44, to suitably move the transmission gears (not shown) for the several speeds, whether the reverse lever be set for forward or reverse. While the form of the transmission may be varied, a suitable form is that which is shown in my co-pending application, Serial No. 476,708, filed August 20, 1930.

Between the frame-members 3, 4, and beneath seats 20, 20, are provided clutch levers 45, 45a, actuable by pedals 46, 46a, the former from the front seat and the latter from the rear seat, said levers being, respectively, mounted fast on rock-shafts 47, 47a, supported on brackets 48, 49, 50 and 51. Cranks 52, 53, and link 54 connect rock-shaft 47 to rockshaft 47a, which latter, in turn, carries a crank-arm 55, connected, through rod 56 to lever 57 mounted fast on the rock-shaft 58. The latter is mounted on clutch-case 11 and actuates the clutch through the usual connections (not shown). To maintain the pedals 46, 46a, in their upper position and the clutch in engagement, a spring 59, re-acting against a fixed support 60, bears against a plate 61 which presses against a nut 62 adjustably threaded on rod 63, the latter being pivotally secured to lever 64 which is fast on shaft 58. A single adjustable pressure device for the clutch and both clutch pedals is thus provided; and an adjustable stop or abutment, in the form of the fixed rods 65 and adjusting nuts 66, may also be employed.

As seen in Fig. 2, the throttle lever 67 is preferably mounted at the left adjacent the side-wall 68 of the cab, and the brake-valve 69 and associated piping 70 (illustrated fragmentarily) is preferably mounted at the right on a standard 71 adjacent the gear lever 35, although these two controls may as readily be reversed in their locations.

It should here be understood that certain parts described above are not illustrated in all the views, and that the throttle and brake controls are shown only in Fig. 2, in order to avoid confusion in the drawings.

It will now be evident that, in operation of the locomotive, when running forwardly the engineer sits in rear seat 20 and, with his right foot on clutch pedal 46a and left hand on throttle lever 67, places reverse lever 22 in the forward position (with his right hand), and then operates the gear lever 35, clutch pedal 46a and throttle 67 with his right hand, right foot and left hand, respectively, and in stopping, manipulates the brake valve 69 with his right hand. From the opposite seat, when running backward, all the controls are equally accessible, but operated by the opposite hands, the clutch pedal 46 being positioned properly for the right foot. All the controls, therefore, except the clutch control, are single controls adapted for dual operation, and even the two clutch pedals operate but a single clutch.

In addition to the foregoing it should be observed that the various control elements and the two seats are all compactly arranged at one side of the cab and substantially in line with the fore and aft windows on that side. Furthermore, the arrangement is such that the clutch apparatus is mainly located between the longitudinal frame members 3, 4, while the transmission apparatus is mainly located inside the plane of frame member 4, and that these frame members, particularly the latter, are nicely utilized to support the structure, as by brackets and the like, and serve also to keep the various parts of the control mechanism properly rigidly positioned with respect to the power-plant and transmission-casing, which latter are rigidly supported between the two inner frame members 4, 4.

It is therefore clear that the entire arrangement is a unified and compact one, in which the various parts neatly co-operate to attain the desired objects.

What is claimed as new, and desired to be secured by Letters Patent, is:

1. In a locomotive, a power-plant, control means, and a pair of seats, part of said control means being positioned out of the way beneath one seat and operable from the other seat, and another part of said control means being oppositely arranged and beneath the seat opposite that first-mentioned.

2. In a locomotive, a power-plant, control means, and a pair of seats, part of said control means being positioned out of the way beneath one seat and operable from the other seat, and another part of said control means being oppositely arranged and beneath the seat opposite that first-mentioned, said parts being paired together for joint operation of a control element.

3. A locomotive having an internal combustion motor for driving the same, a clutch, a transmission including reversing means, a single set of controls for the latter, and a double set of controls for the clutch, the transmission and reversing means with one clutch control being operable from one position, and the said last-mentioned means with the other clutch control being operable from another position, the two clutch controls being interconnected and having common means tending to hold them in clutch-engaged position.

4. A locomotive including a power-plant and a cab and two oppositely arranged seats in the cab, and a single set of controls for the power-plant constructed and positioned for actuation from either of said two seat locations in said cab; one seat, the controls between the seats, and the other seat, being positioned serially in that order, lengthwise of the locomotive, and to one side of said power-plant, whereby clear vision along the side of the power-plant is effected.

5. A locomotive including a power-plant and a cab, and a single set of controls for the power-plant constructed and positioned for actuation from either of two seat locations, together with forwardly and rearwardly-positioned seats in said cab adjacent said controls; one seat, the controls between the seats, and the other seat, being positioned serially in that order, lengthwise of the locomotive, and to one side of said power-plant, whereby clear vision along the side of the power-plant is effected.

6. A locomotive including a power-plant and a cab, and a single set of controls for the power-plant constructed and positioned for actuation from either of two seat locations, together with forwardly and rearwardly-positioned seats adjacent said controls, and suitable apertures in the cab aligned, respectively, one with each seat for clear vision therefrom; one seat, the controls between the seats, and the other seat, being positioned serially in that order, lengthwise of the locomotive, and to one side of said power-plant, whereby clear vision along the side of the power-plant is effected.

7. In a self-propelled railway vehicle, opposite, forward and reverse positioned seats, control mechanism for the vehicle, and a plurality of controls for actuating said mechanism, located between the seats and positioned for convenient operation some by the right hand and some by the left, from one seat, and vice-versa from the opposite seat; one seat, the controls between the seats, and the other seat, being positioned serially in that order, lengthwise of the locomotive, and to one side of said power-plant, whereby clear vision along the side of the power-plant is effected.

8. In a self-propelled railway vehicle, opposite, forward and reverse positioned seats, control mechanism for the vehicle, and a plurality of controls for actuating said mechanism, located between the seats and positioned for convenient operation some by the right hand and some by the left, from one seat, and vice-versa from the opposite seat, together with driving mechanism including a single clutch and dual clutch controls each positioned for operation from one of said seats; one seat, the controls between the seats, and the other seat, being positioned serially in that order, lengthwise of the locomotive, and to one side of said power-plant, whereby clear vision along the side of the power-plant is effected.

In testimony whereof I have hereunto signed my name.

ALBERT J. TOWNSEND.